Jan. 3, 1928.   1,655,306
A. BARR ET AL
PHOTOGRAMMETRIC PLOTTING APPARATUS
Filed June 23, 1927   5 Sheets-Sheet 3
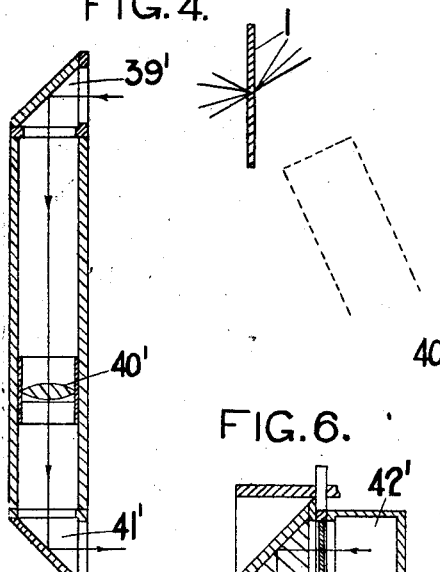
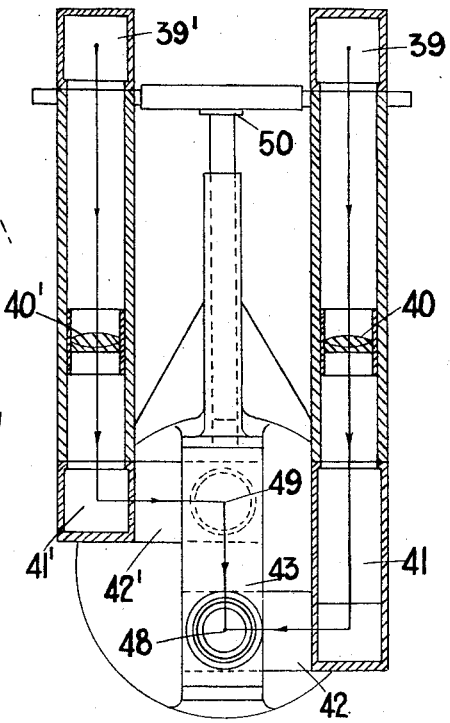
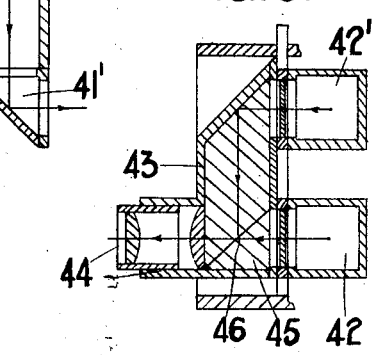
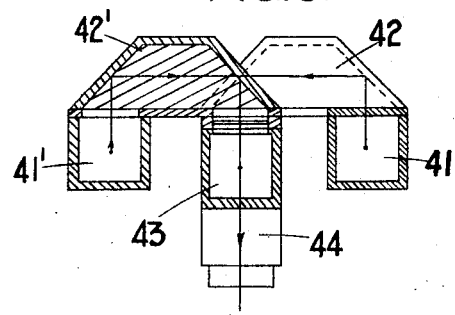
INVENTOR
A. BARR
AND
W. STROUD
BY
Neill & Dunn
ATTORNEYS Patented Jan. 3, 1928.

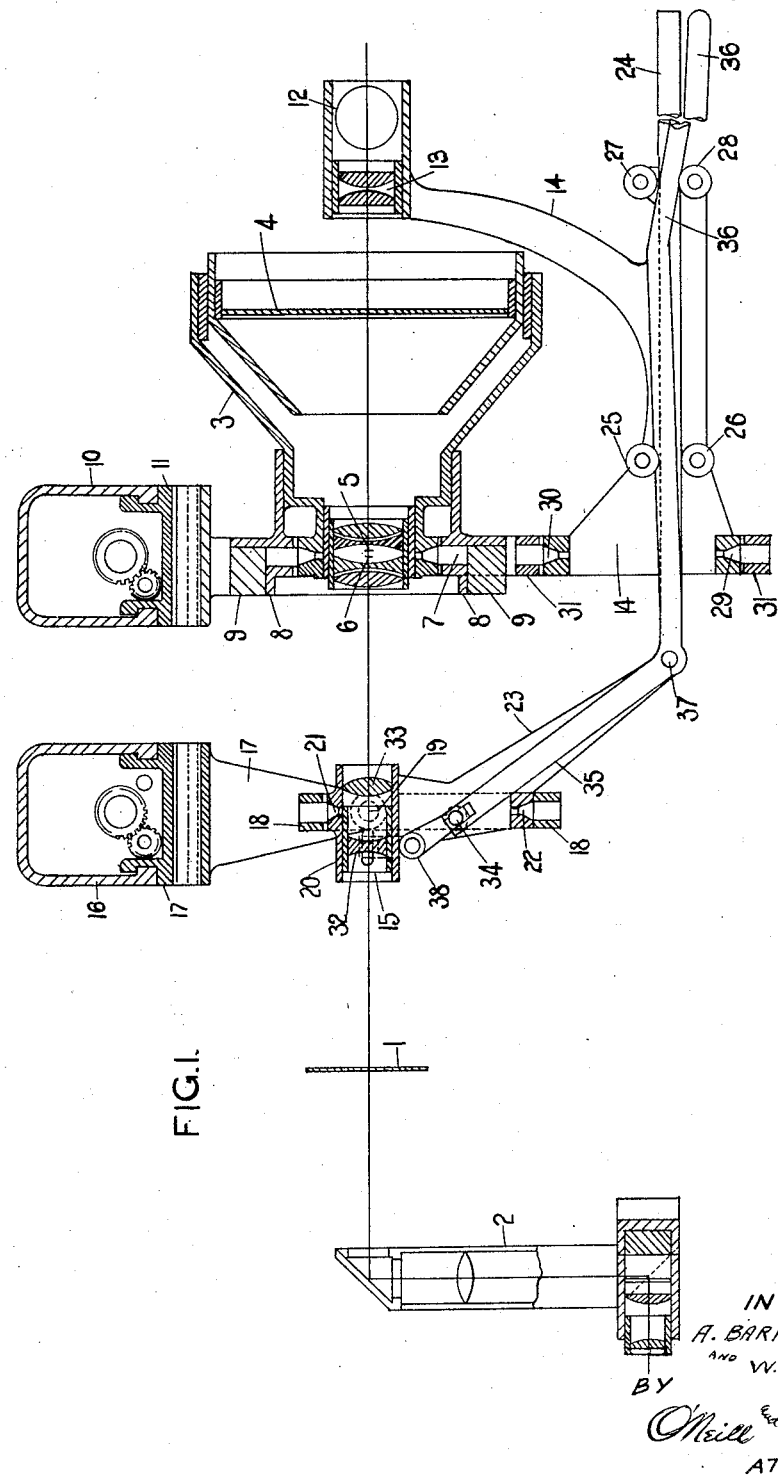

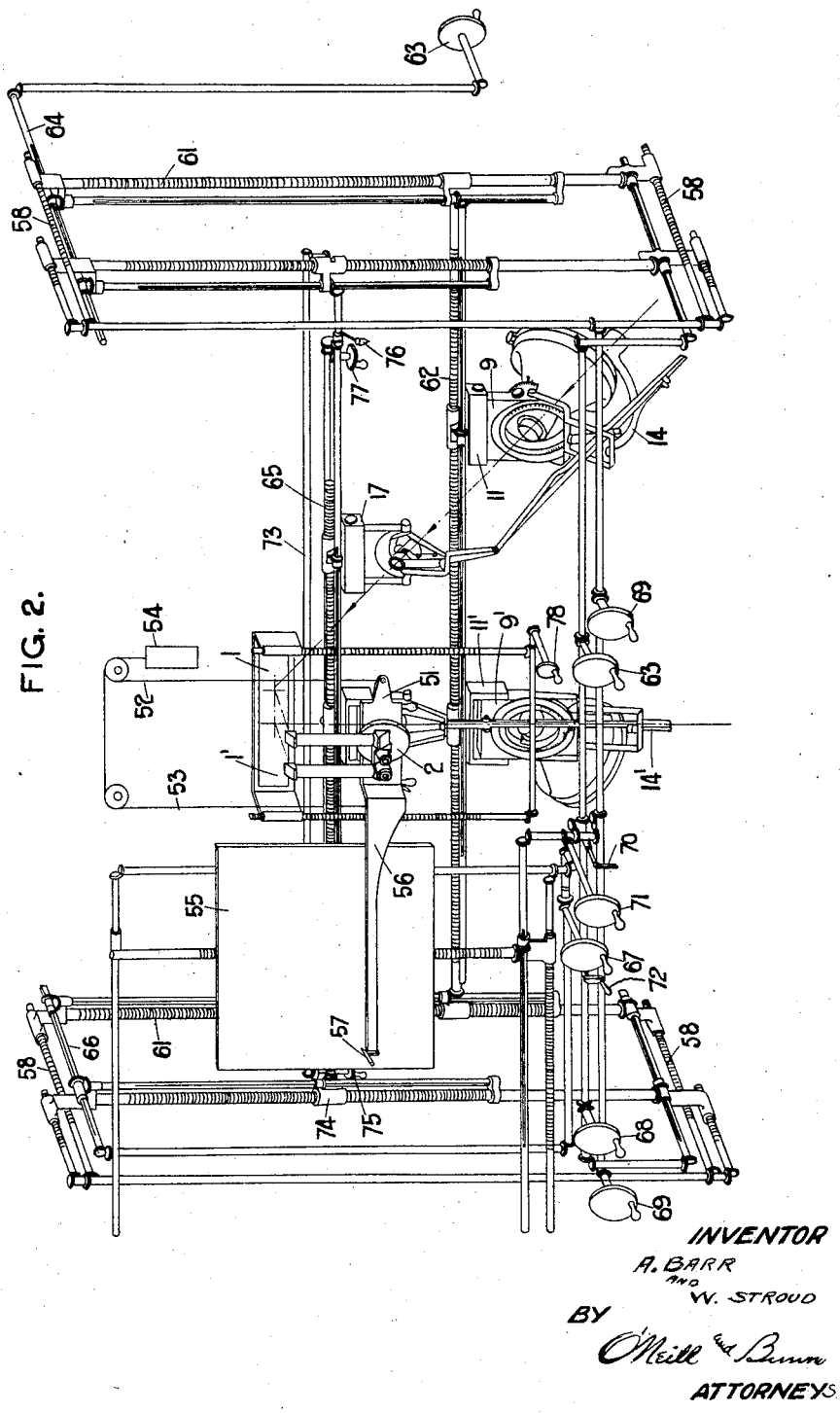

1,655,306

UNITED STATES PATENT OFFICE.

ARCHIBALD BARR AND WILLIAM STROUD, OF ANNIESLAND, GLASGOW, SCOTLAND, ASSIGNORS TO BARR AND STROUD, LIMITED, OF ANNIESLAND, GLASGOW, SCOTLAND.

PHOTOGRAMMETRIC PLOTTING APPARATUS.

Application filed June 23, 1927, Serial No. 200,846, and in Great Britain March 30, 1926.

This invention refers to apparatus for determining, with the use of photographs of the same tract of ground taken from different position in space, the plan or map of points on the earth's surface and also for determining the heights of different points above a datum level and for plotting contour lines on maps. For this purpose, two such photographs are used, and these photographs, are so placed in the apparatus and images of the photographs are so projected on a reference plane that two images of a point on the ground at a certain level are separated from each other by a chosen constant amount in a constant direction.

According to this invention, the images are projected onto the back face of a plane translucent screen and one feature of this invention is that the images are viewed from the front of the screen analogous to viewing an image formed on the ground glass plate of a photographic camera. The projecting apparatus and the screen are movable relatively so that in succession different portions of the tract of ground can be projected on the screen.

For purposes of description in the first place it will be supposed that two photographs of a portion of ground have been taken from an aircraft, and the point on the ground directly below the lens of the camera when the exposure was made will be referred to as the "nadir point", and the angle which the axis of the camera made with the vertical as the "tilt". Further, it will be convenient to suppose that the screen is placed vertically (though in ordinary cases of mapping from aircraft photographs the reference plane corresponds to, or represents, a level surface at the ground).

Behind the screen two projectors of the nature of cameras are provided. In use each of these projectors operates reversely to the optical process of a camera. Each projector consists of a case for carrying one of the photographs, preferably a diapositive, and a lens which should be identical with, or at least have the same focal length as, the lens of the camera by which the photograph was taken. The diapositive is placed in the focal plane of the projector lens, that is at the same distance from the projector lens, (or more correctly, at the same distance from the back nodal point of the projector lens) as the photographic plate was from the back nodal point of the lens of the photographic camera. Each projector is mounted on a holder, being movable thereon about an axis parallel with the screen and which passes through the front nodal point of the projector lens and is at right angles to the axis of the projector lens system. This holder is rotatably mounted in a carrier so that the projector is rotatable about the axis of its lens system and movable to the angle of tilt. Each holder is movable in any direction parallel to the screen so that the front nodal points can be brought into the normals to the screen which pass through the points representing the nadir points as above defined, supposing these two nadir points to have been drawn on the reference plane so that they lie in one horizontal line.

The nadir points in some cases are not represented on the photographs and the projection need not fall within the limits on the translucent screen; they are usually not directly considered in the setting of the instrument. They are only mentioned here for purposes of description.

Further, the projectors are movable together nearer to or farther from the screen so that the distance of the front nodal point of one lens can be brought to a distance from the screen representing on an appropriate scale, the height of the camera above a datum plane when the photograph was taken. As the heights of the two camera positions may not have been the same, provision is made for moving one—or both—of the projectors relatively normal to the reference plane.

As the tilt, the direction of tilt and the height of the camera above the datum level can usually not be sufficiently accurately determined by means of instruments carried on the aeroplane, it is usually necessary to have at least three points—preferably four—on the ground accurately determined in position and in heights above the datum level by other surveying methods, and to include these in at least two photographs from different positions. The correct positions and attitudes of the projector with reference to the reference plane may be determined by a more or less trial and error method but it is convenient to determine the tilt of the camera and its height above datum and the direction of tilt by means of known apparatus.

From the data so obtained for each of a pair of photographs these can be placed in the projectors and the projectors set partially or wholly in their correct positions and attitudes.

When the instrument is in use, light is projected through the diapositive and the lens of the projector—say by means of a lamp provided with a condenser placed behind the part of the photograph to be projected. With a diapositive placed in the focal plane of the projector lens, the rays from one point of the diapositive will, after passing through the projector lens, issue as a parallel pencil. To bring these rays to a focus on the screen, a secondary system of lenses is introduced in their path. Various arrangements of the secondary lens system can be used; in one convenient arrangement the secondary system of lenses is placed about midway between the projector lens and the reference plane and each system is movable parallel with and towards or from the screen by half the amount the projector is moved.

In what follows with reference to the working of the apparatus it will be assumed that when motions of the projectors are referred to the secondary lens systems are also moved appropriately.

Each of the secondary lens systems should have its axis directed in the line of projection and for this purpose is so carried and is so connected with its projector that the axis of the secondary system passes through the front nodal point of the projector lens. The lamp carrier, which is situated behind the diapositive is so connected with the secondary lens carrier and the projector carrier that the lamp sends its beam of light in, or approximately in, the direction of the line of projection, as defined by the projector lens and the secondary lens system. Further, as the pencil of light corresponding to a point on the diapositive issues as a parallel pencil from the projector lens and as the distance from the projector lens to the place on the screen at which the image of that point is to be produced varies, the secondary lens system should be so constructed as to be of variable equivalent focal length and the equivalent focal length should be adjusted in accordance with the distance from the secondary lens system to the image of the point on the screen. A suitable secondary lens system can be constructed of two lenses (preferably compound achromatic lenses) one of which is constant in position relative to the centre of the line joining the front nodal point of the projector lens and the image on the screen, and the other lens moved by an amount depending on the length of that line. Automatic means for moving the second lens in accordance with the conditions may be provided.

By translating the projector carrier (and translating the secondary lens carrier by half the amount and in the same direction) the images of successive points of the diapositive may be caused to fall at a given point on the screen, and the movement of the projector necessary to cause the images of two points of the diapositive to appear succesively at the same point of the screen represents, on a certain scale, the distance between the corresponding points on the ground, assuming for the present the two points to be on the datum plane.

It will be evident that as the picture is formed on a translucent screen which scatters the light falling upon it the picture may be viewed from any direction—for example, normally to the screen—independently of the direction in which the rays from the projector system approach the screen, and the construction is such that the picture of a level surface of ground is a true map or horizontal projection (that is an orthogonal projection on a horizontal plane) of that surface though the photograph from which it is produced may be an oblique perspective view of the ground.

The arrangement can be so designed that the picture of a small part of the ground around the point on the axis of projection is fairly clearly defined and it can be made to represent a map of the ground on the same scale as that above referred to assuming the ground to be level.

The partial pictures of the ground can be viewed from the front by means of a comparator which may be constructed either on the coincidence or the stereoscopic principle, and which is directed so as to receive the rays sent out normally from the translucent screen. In the coincidence type of comparator the images of the two pictures produced on the screen may be brought into the focal plane of one eyepiece and there produced respectively above and below a separating line, in a manner analogous to that employed in the well known coincidence rangefinder. In the stereoscopic type of comparator the rays from the two pictures formed on the screen may be directed towards systems of eyepiece prisms and images of them formed, in this case, in the focal planes of two eyepieces, in each of which there is a mark, so that the two pictures are viewed stereoscopically with reference to the stereoscopic view of the marks.

When the projectors, the secondary lens systems and the comparator are correctly placed and adjusted the two images of one point on the ground fall on the points of the screen whose images are at the mark or marks in the comparator fields and a small part of the ground is seen around these points which we shall refer to as the "indicated points" of the screen.

If now the comparator is held stationary and the projectors (and secondary lens systems) are moved parallel with the screen, keeping their separation constant, the images of a second point on the ground will fall at the indicated points provided the second point on the ground is at the same level as the first one; and the movement of the projectors will indicate in direction and in amount, on a certain scale, the distance between the two points on the ground.

Thus, in the case of level ground if the comparator is held stationary and the projectors are moved in such a way that the mark in the comparator field appears to travel along any line of the ground, or again if the projectors are held stationary and the comparator is so moved that the mark appears to move over a line on the ground a map of such line will be traced by the movement of the projector system or the movement of the comparator.

If the second point on the ground above referred to is at a different level from the first point the two images of that point will not under the conditions above referred to, fall simultaneously at the indicated points on the screen and therefore their images will not both fall at the mark or marks in the comparator fields.

When the coincidence comparator is used the two images of the second point will be separated by a small amount horizontally. The two images may be brought into coincidence with each other by the appropriate alteration of the distance of the projectors from the reference plane and the amount by which the projectors have to be moved to effect coincidence is a measure, on the appropriate scale, of the height of the second point on the ground with reference to the level of the first point. In this way the relative heights of various points can be determined. When the two images have been brought into coincidence, if the projectors are moved to bring the images on to the indicated points, the new position of the projector relative to the first position will indicate the position of the second point on the ground relative to the first point.

In the stereoscopic comparator the two marks viewed stereoscopically appear as one object in space at a certain distance from the observer. We shall refer to this as the "mark."

The second point in the case above described if not at the same level as the first point, will appear to be at a different distance from the mark, but by moving the projectors forward or backward as above described the point may be caused to appear at the same distance as the mark and may be brought apparently to coincide with the mark and the position of the second point relatively to the first is indicated as above described for the coincidence comparator.

The comparator may be movable laterally and vertically, that is any movements parallel to the reference plane, and provision may be made for fixing the comparator in a fiducial position.

It is convenient to place a drawing board or other recording surface at the front of the apparatus, to the right or left of the comparator, with its plane parallel to the screen and nearly coincident with the plane of the screen, and movable up and down and transversely in conformity with the up and down and lateral movements of projectors and to provide scribing means, such as a pencil, movable with the comparator and projecting over the drawing board.

If then the comparator is fixed in position and the pencil touches a sheet of paper on the drawing board and the drawing board is moved in conformity with the motion of the projectors a map will be drawn of such motion. Or again if the projectors are kept stationary and the comparator is moved as above described over the partial picture of the ground the pencil will draw a map of the motion.

If as above referred to, the small picture seen around the mark is on the same scale as the map produced by vertical and lateral movements of the projectors the comparator may be moved over this picture instead of the picture being moved by vertical and horizontal motions imparted to the projector.

The picture will not be perfectly focussed on the screen except that part of it near its centre but the arrangement may be such that in most cases a considerable portion of it is sufficiently clearly defined for use in mapping. If then the pencil is attached to the comparator and the mark is caused to appear to pass along a line on the picture the pencil will trace out that line on the map. For example, if the comparator is moved along a line that is indicated as being level in either of the manners above described the pencil will trace out a contour line, if, as stated above, the projectors have not been moved horizontally or vertically while the portion of the map is drawn that corresponds to the picture seen at one setting of the projectors, or at least, the portion of it that is considered clearly enough defined, and shows no difference of level as above described.

When the photographs have been taken at greater tilt than 45°, including the case of photographs taken from the ground, it is preferable to take a vertical plane of reference with respect to the ground. In such cases the apparatus can still be used, with the vertical plane of reference as above described. In this case, however, the motion of the projector towards or from the reference plane represents decrease or increase of horizontal distance. The motion of the projectors in this direction is geared up to the vertical motion of the drawing board so that as the projectors are carried farther from the screen to effect coincidence, or stereoscopic distance indication, the drawing board is moved in the direction that indicates a greater horizontal distance from the camera position, and a vertical motion of the projector system indicates variation of height of the points observed.

Thus if the lower edge of the map represents the part of the ground nearest the camera, as the projectors are brought nearer to the screen the drawing board is moved upwards.

To allow for difference in height of the cameras in such cases, one of the projector carriers is provided with a vertical adjustment motion.

An example of apparatus comprising means according to this invention will now be described with reference to the accompanying drawings, in which:—

Figure 1 is a vertical section through the principal parts of one of the optical systems.

Figure 2 is a general view of the operating parts of the whole instrument omitting the frame work.

Figure 3 is a front elevation, Figure 4 an end elevation, Figure 5 is a sectional plan, and Figure 6 sectional elevation of one form of coincidence comparator.

In the various figures corresponding points for the two projecting systems are indicated by plain figures (such as 40), for the right hand element and by indexed figures (such as $40^1$), for the left hand element shown in vertical sections.

Figure 9:
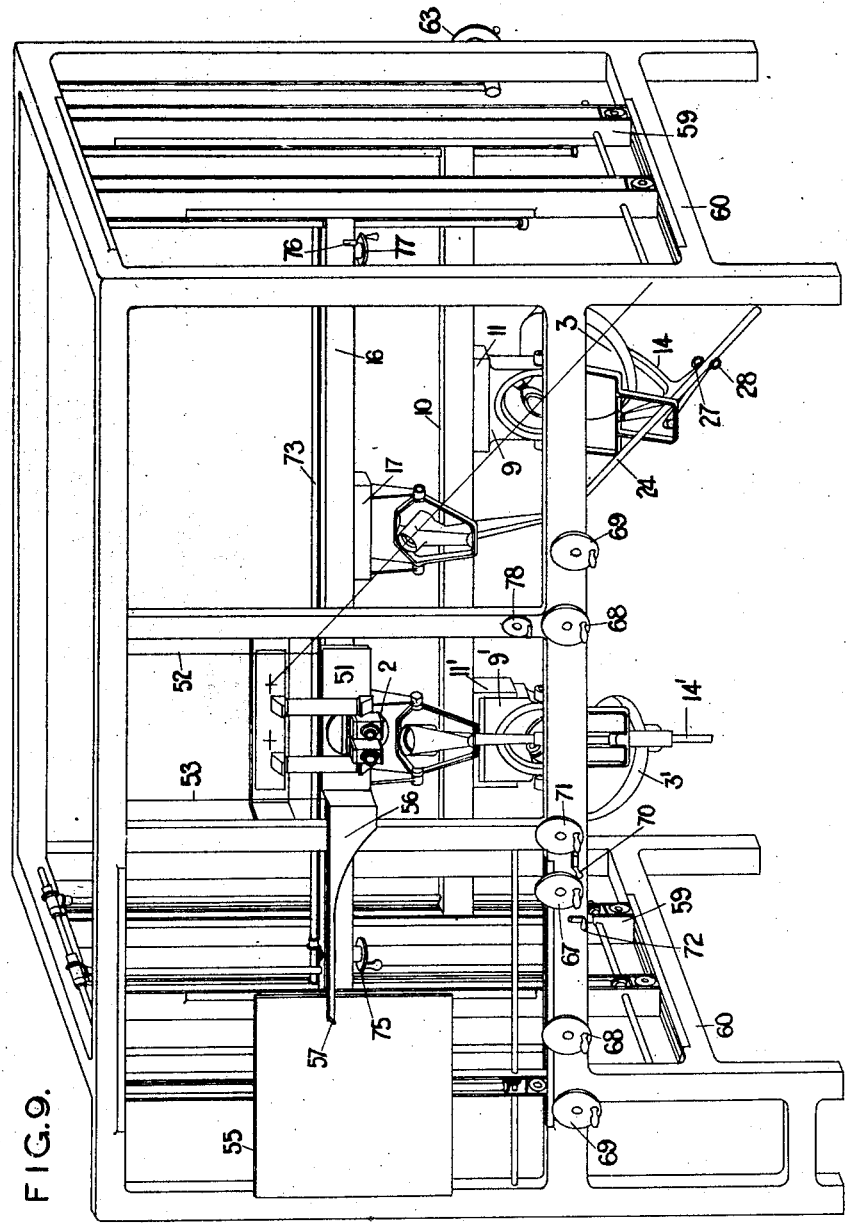
Figure 9 is a general view of the whole instrument.

In Figure 1, 1 is the translucent screen representing the reference plane on which the image of the photograph is projected; 2 is the comparator by which the images are observed from the front of the screen; 3 is the case of the projector carrying the diapositive photograph at 4; 5 is the back nodal point and 6 the front nodal point of the lens; 7 is the axis about which the projector may be angled; this axis passes through the front nodal point 6 of the lens. The holder 8 of the projector is in ring form and is rotatably mounted in the carrier 9. The carriers of the two projectors are shown in Figures 2 and 9 as 9 and $9^1$. In Figure 1 the beam from which the carriers 9 and $9^1$ are borne and along which they can slide is shown in section at 10. The carrier 9 (Figure 2) is arranged to slide in the part 11 (which is itself slidable along the beam 10) in the horizontal direction normal to the plane of the screen 1 and the carrier $9^1$ is slidable in the part $11^1$ in a vertical direction parallel to the screen $1^1$.

In Figure 1, 12 is a lamp which with the condenser 13 is carried from the bracket 14 shown also at 14 and $14^1$ in Figures 2 and 9.

In Figure 1 the carrier of the secondary lens system is represented at 20.

A beam 16 shown in Figures 1 and 9 supports the secondary lens system.

In the system shown the secondary lens system is situated midway between the camera lens and the translucent screen. In this case the angular magnification produced by the secondary lens system should be two, so that the size of the image on the translucent screen of a small part of the photograph in the projector is the same as it would be if there were no secondary lens system and the projector lens were of pinhole size.

The forked member 17 is arranged to slide longitudinally on beam 16, and in the fork the rectangular gimbal ring 18 can swing about a horizontal axis 19. The ring 18 supports the secondary lens holder 20 by means of the tapered pins 21 and 22 about which it can also swing.

The secondary lens system shown comprises a convex lens 33 and a concave lens 32. Lens 32 is movable in holder 20 for alteration of the equivalent focal length of the combination.

The holder 20 has an arm 23 which is prolonged as a rod 24. This rod 24 can move longitudinally between the grooved rollers 25, 26, 27 and 28 which rollers are carried from the bracket 14. The bracket 14 can turn about an axis provided by the pin bearings 29 and 30 borne in a frame 31 which is prolonged upwards as a fork and is pivoted on the carrier 9 about a horizontal axis passing through the front nodal point 6 of the projector lens.

The bearing rollers 25—28 constrain the bracket 14 always to occupy the same position relatively to the axis of the rod 24, and as will be readily seen the arrangement of points described constrain the axis of the secondary lens system so as always to pass through the front nodal point 6 of the projector lens however the projector and secondary lens system are moved relatively to each other.

It will also be evident that the lamp and condenser are maintained in line with the points 6 and 19 so that it always sends a beam through the axis of the system however the various points of the mechanism are moved.

As has been explained above when the photograph 4 is set at the correct distance from the lens of the projector the rays radiating from a point on the photograph issue as a parallel pencil from the front of the lens. The secondary lens system is designed to make these rays convergent and come to a focus on the screen 1. The distance of the secondary lens system from the screen can be altered by a relative motion between the beam 16 and the support of the screen. The equivalent focal length of the secondary lens system has therefore to be adjustable. This adjustment is made by moving the lens 32 relatively to the back lens 33 of the combination. The adjustment may be made directly by hand or it can be made automatically as the distance of the lens system from the screen is altered. In the case being described the axis 19 is maintained midway between the front nodal point of the lens and the trace on the screen of the line joining 6 and 19. The secondary lens system has therefore to be adjusted according to the distance of the point 19 from the point 6. One means of effecting this adjustment is shown in Figure 1. The holder 15 of the lens 32 is slidable in carrier 20. Pins passing through slots in the holder 20 engage in slots in a forked crank 38 which at 34 carries another pin which engages in a slot at the end of one arm of the bell crank lever 35—36 pivoted to the arm 23 at 37. The arm 36 rests on a roller on a bearing which in the figure lies in front of the grooved roller 28. It will be readily seen that by forming the arm 36 properly, the distance of the lens 32 from the lens 33 may be caused to alter in the required manner as the distance between the points 19 and 6 is altered—that is as the distance of the point 19 from the image on the screen (as above described) is altered.

By the arrangement described points on the photograph are represented by images formed on the translucent screen, and as light diverges from such images as if they were real objects any type of instrument suitable for viewing real objects can be used for observing the images.

Suitable types of comparators working respectively on the coincidence and the stereoscopic principle will now be described.

The coincidence comparator shown in Figures 3 to 6 comprises a right angled reflecting prism $39^1$ which receives scattered light from the images on the translucent screen 1 and directs it downwards through a lens $40^1$ to a right angled prism $41^1$ which directs it backwards to a double reflecting prism $42^1$ by which it is again reflected forwards to a prism 43 by which it is directed first downwards and then outwards through an eyepiece 44. The beam from the right hand image is similarly treated by the optical system 39, 40, 41 and 42.

The lower inclined surface of the prism 43 is silvered over half its surface, say the lower half up to a horizontal line through 46, and the right angled prism 45 is cemented to 43.

By this means only the lower part of the left hand beam is reflected through the eyepiece and the upper half of the right hand beam passes without reflection through the upper part of the prism 45 and through prism 43.

The optical system of the comparator is so arranged that images of the images on the translucent screen are formed at 46, and the edge of the silvering at 46 forms a horizontal separating line between the two partial fields in the manner well known in the construction of coincidence rangefinders.

Figure 7:
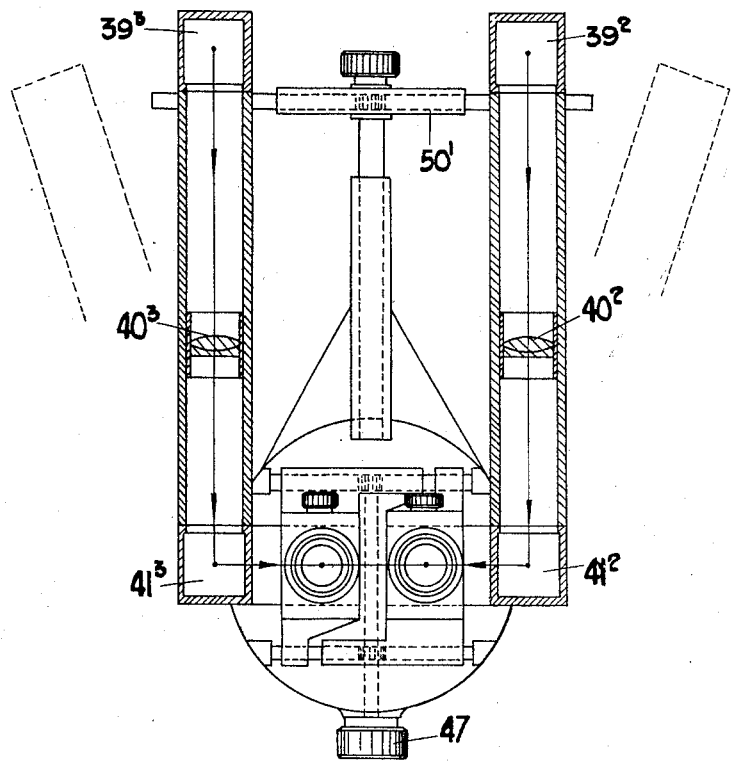
Figure 7 is a front elevation and Figure 8 is a sectional plan of one form of stereoscopic comparator.
Figure 8:
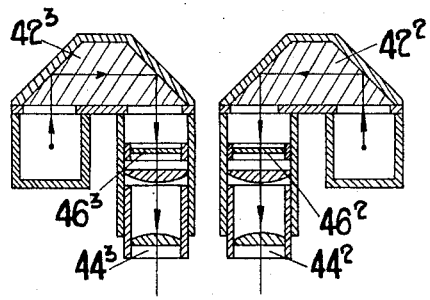

A suitable comparator working on the stereoscopic principle is represented in Figures 7 and 8. The construction is in general similar to that above described for a coincidence comparator, the parts $39^2$, $39^3$, $40^2$, $40^3$, $41^2$ and $41^3$ performing like functions to the parts 39, $39^1$, 40, $40^1$, 41 and $41^1$ of the coincidence comparator. The prisms $42^2$ and $42^3$ reflect the beams directly through two eyepieces $44^2$ and $44^3$, respectively. Images of the images on the translucent screen are formed in the planes $46^2$ and $46^3$ where marks are provided for stereoscopic vision as above described.

The distance between the eyepieces $44^2$ and $44^3$ can be adjusted to suit the interocular distance of the observer, say by rack and pinion operated by 47.

In either type of comparator the distance between the prisms 39 and $39^1$ or $39^2$ and $39^3$ can be altered to correspond to the distance between the images which on the translucent screen represent one point in the object photographed. This is conveniently arranged by hinging the tubes carrying the lenses 40 and $40^1$ about axes at 48 and 49 and staying them by a sliding clamp at 50. In the case of the stereoscopic comparator the corresponding arm may conveniently be hinged about axes coincident with those of the eyepieces.

As illustrated, see Figure 2, the comparator is so supported that it may be moved horizontally and vertically in a plane parallel to the reference plane. For this purpose it is shown carried by a part 51, see Figure 2, which is supported by two cords or wires 52, 53 passing over pulleys and attached to one weight 54. The part 51 may also be guided so that it can only move parallel to the plane of the screen 1.

The map board shown in Figures 2 and 9 at 55 is also movable in its own plane horizontally and vertically. Attached to the comparator part 51 there is a bracket 56 having at its outer end scribing means, such as a pencil 57. If the drawing board remains stationary the pencil will trace out on paper fixed on the board a record of the movements of the comparator relatively to the frame of the instrument and again if the pencil, and therefore the comparator, remain stationary the pencil will draw a record of the motion of the map board.

A mechanism providing for the required motion is indicated in Figures 2 and 9. In Figure 2 four screws 58 (driven equally) serve to move the two columns 59 (Figure 9) along the parts 60 of the framework. Vertical screws 61 support the beam 10. The screw 62 serves to move the projector carriers 11 and 11¹ along the beam 10. The projector carrier 11 can be caused to approach or recede from the carrier 11¹ by rotating the nut in the carrier 11 in which the screw 62 works. The rotation of the nut is effected by means of gears and the handwheel 63 and the slotted shaft 64.

The carrier 17 of the secondary lens system is similarly movable along the beam 16, at half the speed of the projector carrier 11, by means of the handwheel 63. Thus handwheel 63 operates means for setting the distance between the two projectors, and simultaneously the distance between the secondary lens systems.

When plotting, the projector carriers 11 and 11¹ move together, along the beam 10 (Figure 9) by means of the screw 62 (Figure 2) and the secondary lens systems, together, along the beam 16 (Figure 9) by means of the screw 65 (Figure 2), both movements being made by gears and slotted shaft 66 (Figure 2) from a common handwheel 67 (Figures 2 and 9).

Movements of the projectors and secondary lens systems in the other two directions are similarly made, as above described, by means of gearing and handwheels 68 and 69.

The map board 55 may be moved independently in its own plane, vertically, by means of a declutching lever 70 and handwheel 71, and horizontally by means of a declutching lever 72 and handwheel 67.

Independent movement of the secondary lens system in a vertical direction may be made by means of a cross shaft 73 (which rotates the nuts 74) and handwheel 75.

The carriers 17 and 17¹ of the secondary lens systems may recede or approach each other independently of the projectors by means of gearing, a declutching lever 76, and handwheel 77 (Figures 2 and 9).

When operating on photographs taken at a greater tilt than 45°, say for example photographs taken with the axis of the camera horizontal, the map board may be disconnected from the drive 61 and connected to the drive 58 by means of the declutching lever 70.

By means of handwheel 78 the screen 1 may be lowered to suit the lower position of the comparator 2 (i. e. when it is swung round through 180° from the position shown in Figures 2 and 9).

We claim:—

1. Photogrammetric plotting apparatus, comprising a translucent screen, two projectors, each projector having a projector lens, two secondary focusing lens systems, one for each projector, a comparator, and scribing means operated in response to movement of said comparator, the two projectors being located behind the translucent screen, the focusing lens systems being between the projectors and the screen, and the comparator being located in front of the translucent screen, for the purposes set forth.

2. Photogrammetric plotting apparatus, comprising a translucent screen, two projectors movable in any direction, each projector having a projector lens, two secondary focussing lens systems, one for each projector, a comparator, and scribing means operated in response to movement of said comparator, the two projectors being located behind the translucent screen, the focussing lens systems being between the projectors and the screen, and the comparator being located in front of the translucent screen, for the purposes set forth.

3. Photogrammetric plotting apparatus comprising a translucent screen, two projectors, each projector having a projector lens, two secondary focussing lens systems, one for each projector, a comparator movable in any direction parallel to the plane of the translucent screen but without rotation about an axis normal to the translucent screen, and scribing means operated in response to movement of said comparator, the two projectors being located behind the translucent screen, the focussing lens systems being between the projectors and the screen, and the comparator being located in front of the translucent screen, for the purposes set forth.

4. Photogrammetric plotting apparatus, comprising a translucent screen, two projectors, each projector having a projector lens, two secondary focussing lens systems, one for each projector, a comparator constructed on the stereoscopic principle, and scribing means operated in response to movement of said comparator, the two projectors being located behind the translucent screen, the focussing lens systems being between the projectors and the screen, and the comparator being located in front of the translucent screen, for the purposes set forth.

5. Photogrammetric plotting apparatus, comprising a translucent screen, two projectors movable in any direction, each projector having a projector lens, two secondary focussing lens systems, one for each projector, a comparator movable in any direction parallel to the plane of the translucent screen but without rotation about an axis normal to the translucent screen, and scribing means operated in response to movement of said comparator, the two projectors being located behind the translucent screen, the focussing lens systems being between the projectors and the screen, and the comparator being located in front of the translucent screen, for the purposes set forth.

ARCHIBALD BARR.
WILLIAM STROUD.